United States Patent [19]

Hertzog et al.

[11] Patent Number: 4,507,554

[45] Date of Patent: Mar. 26, 1985

[54] METHOD AND APPARATUS FOR DETERMINING BOREHOLE AND FORMATION CONSTITUENTS

[75] Inventors: Russel C. Hertzog, Jakarta, Indonesia; William B. Nelligan, Danbury, Conn.

[73] Assignee: Schlumberger Technology Corporation, New York, N.Y.

[21] Appl. No.: 464,162

[22] Filed: Feb. 7, 1983

[51] Int. Cl.³ .................................. G01V 5/10
[52] U.S. Cl. ........................................ 250/270
[58] Field of Search ............... 250/270, 269, 256

[56] References Cited

U.S. PATENT DOCUMENTS

| | | | |
|---|---|---|---|
| 3,461,291 | 8/1969 | Goodman | 376/11 |
| 3,510,655 | 5/1970 | Givens | 250/262 |
| 3,521,064 | 7/1970 | Moran et al. | 250/269 X |
| 3,546,512 | 12/1970 | Frentrop | 376/109 |
| 3,946,226 | 3/1976 | Smith, Jr. | 250/256 |
| 4,012,712 | 3/1977 | Nelligan | 340/857 |
| 4,020,342 | 4/1977 | Smith, Jr. et al. | 250/270 |

FOREIGN PATENT DOCUMENTS

| | | |
|---|---|---|
| 45686 | 2/1982 | European Pat. Off. |
| 2056060 | 3/1981 | United Kingdom |
| 2083213 | 3/1982 | United Kingdom |

OTHER PUBLICATIONS

P. Westaway, R. Hertzog, R. Plasek; "The Gamma Spectrometer Tool Inelastic and Capture Gamma-Ray Spectroscopy for Reservoir Analysis", Paper SPE94-61-Presented at the SPE 55th Annual Fall Technical Conference and Exhibition, Dallas (1980).
R. C. Hertzog: "Laboratory and Field Evaluation of an Inelastic-Neutron-Scattering and Capture Gamma Ray Spectroscopy Tool", Paper SPE 7430-Presented at the SPE 53rd Annual Fall Technical Conference and Exhibition, Houston (1978).

*Primary Examiner*—Alfred E. Smith
*Assistant Examiner*—Constantine Hannaher
*Attorney, Agent, or Firm*—David P. Gordon; Stephen L. Borst

[57] ABSTRACT

A method and apparatus for determining the contents of a borehole traversing a subterranean formation is provided. In the method, a well-logging sonde is used to bombard the contents of a borehole and the formation with fast neutrons. An early capture spectrum signal is generated to reflect the composition of the formation and the contents of the borehole. A late capture spectrum signal is generated to reflect the composition of the formation. The early capture spectrum signal is compared with the late capture spectrum signal to derive an output signal representative of the spectral composition of the contents of the borehole.

Additionally provided are improved methods and apparatus for determining the contents of a subterranean formation. An inelastic spectrum signal is generated to reflect the detailed combined composition of the formation and contents of the borehole. The output signal representative of the spectral composition of the contents of the borehole previously derived is used to eliminate the borehole contribution to the detailed combined composition of the formation and borehole and to correct the resulting detailed formation composition signal. Alternatively, an improved formation signal may be derived without the inelastic spectra information. The output signal representative of the spectral composition of the contents of the borehole may be used to eliminate any borehole contribution to the late capture spectrum signal.

16 Claims, 2 Drawing Figures

METHOD AND APPARATUS FOR DETERMINING BOREHOLE AND FORMATION CONSTITUENTS

BACKGROUND OF THE INVENTION

This invention relates to well logging, and more particularly, to a method and apparatus for using spectral techniques in determining the composition of the contents of a borehole and the formation adjacent the borehole.

DESCRIPTION OF THE PRIOR ART

In nuclear well logging, fast neutrons are used to bombard the formations surrounding the borehole. The resulting gamma rays emanating from the formation are recorded and analyzed in a spectral fashion to determine the constituents of the formation and the wellbore. In accordance with U.S. Pat. No. 3,521,064 to Moran et al., a detected gamma ray energy spectrum for a formation of unknown composition is compared with a composite spectrum made up of weighted standard spectra of the constituents postulated to comprise the formation. The weights for the standard spectra which give the best fit of the composite spectrum to the unknown spectrum represent the relative proportions of the constituents in the formation. By appropriate selection of the standards, the proportions of the constituents of interest, such as carbon, oxygen, chlorine, hydrogen, etc., can be obtained and the desired information regarding oil content may be derived.

In bombarding a subterranean formation with fast neutrons, the neutrons must pass through the fluid contents of the borehole before entering the formation. The borehole contributions to the inelastic and capture gamma ray spectra introduce significant errors in the analysis of the formation. At present, these contributions are accounted for by calibrating a logging tool in a reference borehole having known borehole contents and formation compositions. However, laboratory conditions do not necessarily reflect the real composition of the contents of the borehole, and thus, inaccuracies occur in the constituent proportions obtained from the spectra matching process.

A more accurate accounting of the composition of the borehole contents must be made in order to obtain more accurate information concerning the constituents of the earth formations surrounding a borehole. Although the composition of the contents of the borehole may be determined through the use of other logs, relying upon caliper, sonic, or electrical measurements, for example, these logs require an accurate recording of the measurements and the corresponding positions along the length of the borehole. A separate borehole pass may be required for each measurement, further contributing to errors which occur from merging the data to assure depth correspondence. Each of the separate logs requires additional expense and delays and contributes further errors.

SUMMARY OF THE INVENTION

In accord with the present invention, a method of determining the composition of the contents of a borehole traversing a subterranean formation comprises the steps of bombarding the contents of the borehole and the formation with a source of high energy neutrons. An early capture spectrum signal representative of the gamma rays emanating from both the formation and borehole is generated. A late capture spectrum signal representative of the gamma rays emanating from the formation is next generated. The early capture spectrum signal is compared with an early capture spectrum standard to generate a signal representative of the combined spectral composition of the formation and contents of the borehole. The late capture spectrum signal is then similarly compared with a late capture spectrum standard to generate a signal representative of the composition of the formation. The combined formation-borehole signal determination is compared with the formation signal determination to generate a signal representative of the composition of the contents of the borehole. This method can additionally be used to determine the spectral composition of a region immediately surrounding the borehole.

In accord with another aspect of the present invention, an apparatus for deriving the spectral composition of the contents of a borehole traversing a subterranean formation, and the composition of the formation, comprises a pulsed neutron source for bombarding the contents of the borehole and the formation. A gamma ray detector, in conjunction with other electronics, is employed to produce an inelastic spectrum signal (in response to the detected gamma rays which were produced by inelastic scattering of high energy neutrons) during the neutron burst, an early capture signal during a first time interval, and a late capture signal during a second time interval. Both capture time intervals are chosen to occur after the neutron burst. Means for spectrally analyzing the inelastic signal, the early capture signal, and the late capture signal include inelastic, early capture, and late capture spectra standards. Means are provided for comparing the early capture and the late capture spectral analyses to derive an output signal representative of the spectral composition of the contents of the borehole.

The inelastic output signal, which represents the composition of both the borehole and the formation, can be corrected to supply information on only the formation by using the output spectral borehole composition signal which was derived from the comparison of the early and late capture spectral analyses. Likewise, the late capture output signal which in actuality contains some borehole information in its signal, may be similarly corrected. Thus, by using the accurate borehole composition signal to correct the inelastic signal, and/or the late capture signal, a more accurate determination of the formation composition may be gained.

BRIEF DESCRIPTION OF THE DRAWINGS

A more complete understanding of the invention and its advantages will be apparent from the following Detailed Description taken in conjunction with the accompanying drawings in which.

DETAILED DESCRIPTION

Figure 1:
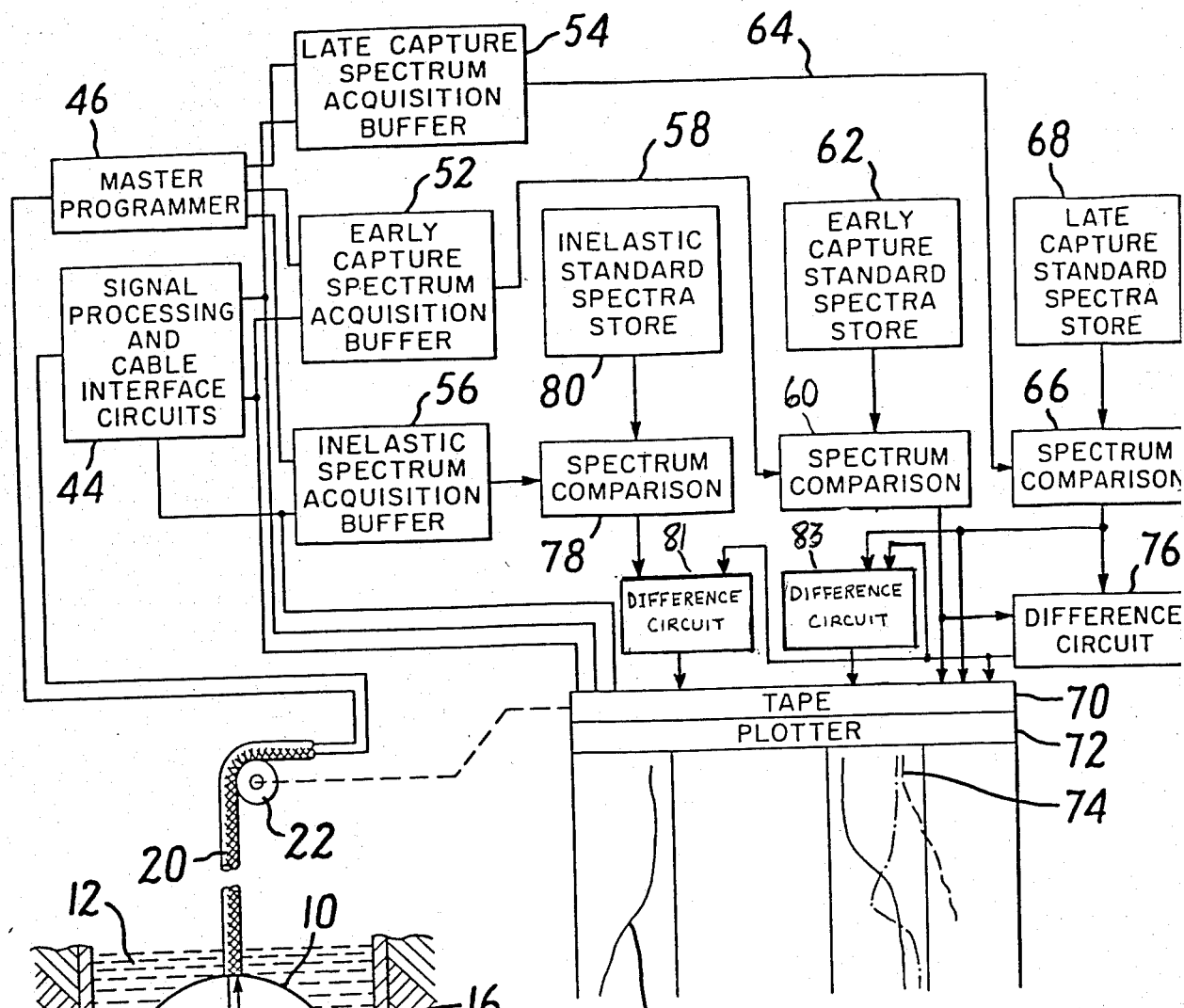
FIG. 1 is a schematic drawing of one embodiment of an apparatus of the present invention.

FIG. 1 illustrates a logging sonde 10 used in accord with the present invention positioned in a borehole 12 traversing a subterranean formation 14. Borehole fluids 18 fill the borehole 12, as is evident to those with skill in the art.

The logging sonde 10, hereinbelow described, is, in the preferred embodiment, constructed in accord with a pending patent application Ser. No. 174,969, filed Aug. 4, 1980, by James A. Grau, entitled "SPECTROSCOPIC ANALYSIS WITH BACKGROUND COMPENSATION", and assigned to the assignee of the present application, now abandoned. Other logging sondes 10 suitable for use in accord with the present invention will be suggested to those with skill in the art.

The logging sonde 10 is suspended in the wellbore 12 by an armored cable 20. The depth of the logging sonde 10 is adjusted by varying the length of the armored cable 20 across sheath wheel 22. Although no tubing is shown in the well bore 12, the tool, if desired, may be sized for through tubing use. It will be understood that the invention has application also to open-hole logging.

The sonde 10 includes a pulsed neutron source 24 for producing primary radiation to irradiate or bombard the formation with fast neutrons, and a radiation detector 26 for detecting secondary radiation emanating from the formation. The neutron source 24 preferably is of the pulsed accelerator type described in U.S. Pat. No. 3,461,291 to C. Goodman and U.S. Pat. No. 3,546,512 to Frentrop, both of which are commonly owned with this application. This type of neutron source is particularly suited to generate discrete bursts of high energy or fast neutrons, e.g., at 14 MeV., of controlled duration and repetition rate.

The detector 26 may be of any construction appropriate to the detection of gamma rays and to the production of an electronic signal in response to each detected gamma ray having an amplitude representative of the energy of the detected gamma ray. Generally, such a detector 26 includes a scintillation crystal 28 which is optically coupled to a photomultiplier tube 30. The crystal is preferably of the thallium-activated iodide type, although any suitable crystal such as thallium or sodium activated cesium iodide or bismuth germanate may be used. Alternatively, a solid state detector, having, for example, a germanium crystal, can be employed. A neutron shield 32 can be positioned between the neutron source 24 and the detector 26 to reduce bombardment of the detector by neutrons issuing directly from the source 24.

Electrical power for the sonde 10 is supplied through the cable 20 from a power source (not shown) at the surface. Suitable power sources (also not shown) are also included in the sonde 10 for driving the neutron source 24, the detector 26, and other downhole electronics. The sonde 10 may be surrounded by a boron carbide impregnated sleeve 34 located generally in the region of the source 24 and the detector 26. The sleeve 34 acts as a neutron absorber for reducing over time the neutron interactions in the immediate vicinity of the source 24 and the detector 26 (i.e. in the borehole), said interactions producing detectable gamma rays. An amplifier 36 acts on the output pulses from the photomultiplier tube 30. The amplified photomultiplier pulses are thereafter applied to a pulse height analyzer (PHA) 38 which may be of any conventional type such as a single ramp (Wilkinson Rundown) type. Other suitable pulse height analog to digital converters may be used for the gamma ray energy range to be analyzed. Linear gating circuits may also be employed for control of the time portion of the detector signal frame to be analyzed. Those skilled in the art will additionally recognize that improved performance will be obtained by the utilization of a pulse pile-up rejector.

Pulse height analyzer 38 segregates the detector pulses into predetermined channels according to their amplitude to provide an energy spectrum and supplies signals in suitable digital form representing the amplitude of each analyzed pulse. The digital outputs of pulse height analyzer 38 are stored in a buffer memory 40 and are then transferred to telemetry and cable interface circuits 42 for transmission over cable 20 to the surface. At the surface, the cable signals are received by signal processing and cable interface circuits 44. It will be understood that the circuits 42, 44 may be of any suitable known construction for encoding and decoding, multiplexing and demultiplexing, amplifying and otherwise processing the signals for transmission to and reception by the uphole electronics. Appropriate circuits are described, for example, in U.S. Pat. No. 4,012,712 to Nelligan.

The operation of the sonde 10 is controlled by signals sent downhole from a master programmer 46, located, if desired, at the surface. These signals are received by a tool programmer 48 which transmits. control signals to the neutron source 24 and the pulse height analyzer 38.

In addition, logging sonde 10 may contain a temperature sensor 50 which compensates the readings from the sonde 10 for the temperature of the borehole fluids 18.

Located at the surface of the borehole 12 are the various electronic circuits used in accord with the present invention. The signal processing and cable interface circuits 44 suitably decode the information received from the well logging sonde 10 and transmit this information to the early capture spectrum acquisition buffer 52, the late capture spectrum acquisition buffer 54, and the inelastic spectrum acquisition buffer 56. Information from the early capture spectrum acquisition buffer is transmitted over line 58 to the spectrum comparision curcuit 60. This information is then compared i.e. by a least squares fitting technique, with an early capture standard spectrum stored in memory 62 to determine the relative constituents of the sampled materials. The early capture standard spectrum may be determined in the laboratory and represents a set of elemental standard capture spectra including those elements that might appear in a formation or a wellbore. More particularly, a weighted superimposition of the elemental standard capture spectra in a particular set constitutes the early capture standard spectrum corresponding to that set. The output of spectrum comparison circuit 60, as described hereinafter, represents the constituents of the formation and the borehole contents.

Correspondingly, information in the late capture spectrum acquisition buffer passes over line 64 to a late capture spectrum comparision circuit 66, where the information is compared with the late capture standard spectrum stored in memory 68. The late capture standard spectrum may also be laboratory determined and represents a set of elemental standard capture spectra of those elements that might appear in the formation. The spectrum comparision circuit 66 provides a signal which represents an analysis of the constituents of the information garnered from the late capture spectrum. Correction of the detected spectra for dead time losses before comparison may be desirable for obtaining maximum accuracy as those skilled in the art will appreciate.

After the constituents of the early capture and the late capture spectra have been determined, these constituents are output to a tape 70 which can be used to drive a plotter 72 for a graphical depiction 74 of the constituents over borehole depth.

Further, the outputs of the spectrum comparison circuits 60, 66 can be compared in a difference circuit 76. In the shown embodiment, the late capture signal representing the constituents of the formation is subtracted from the early capture signal representing the constituents of the borehole and formations to derive a signal representing the contents of the borehole. The subtraction of the signals may be a true subtraction if the input signals contain constituent information in terms of mass per unit volume. Otherwise, weighting and normalization techniques must be utilized. The output from the difference circuit 76 can be plotted on plotter 72 along with the output of the spectrum comparison circuits 60, 66.

In another embodiment, the information from the late capture spectrum acquisition buffer 56 may be used to strip the early capture spectrum in buffer 52 according to well-known stripping techniques. The resulting signal could then be compared in a spectrum comparison circuit with a borehole standard spectrum comprised of a set of elemental standard capture spectra which includes those elements that might appear in a borehole, or the normalized difference between the early and late capture standard spectra stored in memory to provide a signal representing the constituents of the borehole contents.

In addition, the inelastic spectrum acquisition buffer circuit 56 can transmit information to a spectrum comparision circuit 78 which compares this information to a standard inelastic spectrum (representing a set of elemental standard inelastic spectra of those elements that might appear in the borehole or the formation) stored in memory 80. The acquired inelastic spectrum includes contributions from elements such as oxygen and carbon which are not identifiable in the capture spectra but which are useful in the analysis of formations. However, the acquired inelastic spectrum also includes information regarding the borehole constituents, some of which (e.g. chlorine) due to their nature, skew the information gained on the other constituents. For example, the salinity of a borehole may significantly effect a determined C/O ratio. Thus, it is desirable to know the borehole fluid constituents so that their effects can be removed from the acquired inelastic spectrum. The information derived from the early and late capture spectra may be advantageously used for this purpose. The output of difference circuit 76 which provides a signal representing the constituents of the borehole contents may be provided along with the inelastic spectrum comparison signal from circuit 78 to a difference circuit 81. The resulting signal will provide a more complete, detailed, and accurate reflection of the formation composition and may be plotted on plotter 72 as a geophysical depiction 82.

If desired, the output of difference circuit 76, which provides a signal representing the constituents of the borehole contents, may also be used to correct the output of spectrum comparison circuit 66 ideally containing information on only the constituents of the formation. However, as the borehole in fact does contribute to the detected late capture signal, a more accurate reflection of the formation composition may be obtained by subtracting the output of difference circuit 76 from the output of comparison circuit 66 according to the subtraction techniques previously discussed. Of course, the more accurate, corrected formation signal resulting from such a comparison in difference circuit 83 may be plotted on plotter 72, if desired.

Figure 2:
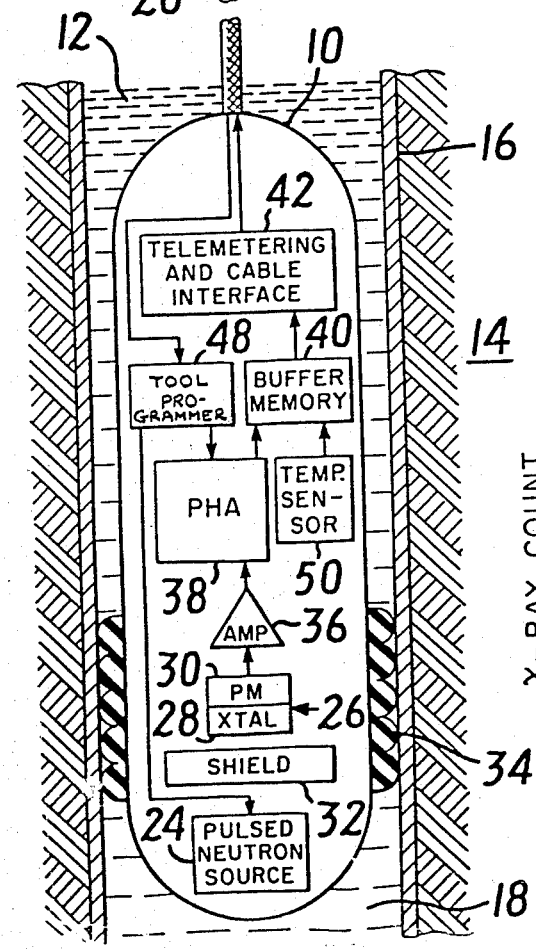
FIG. 2 is a graphical illustration of the gamma ray counts generated in accord with the present invention.
Figure 2:
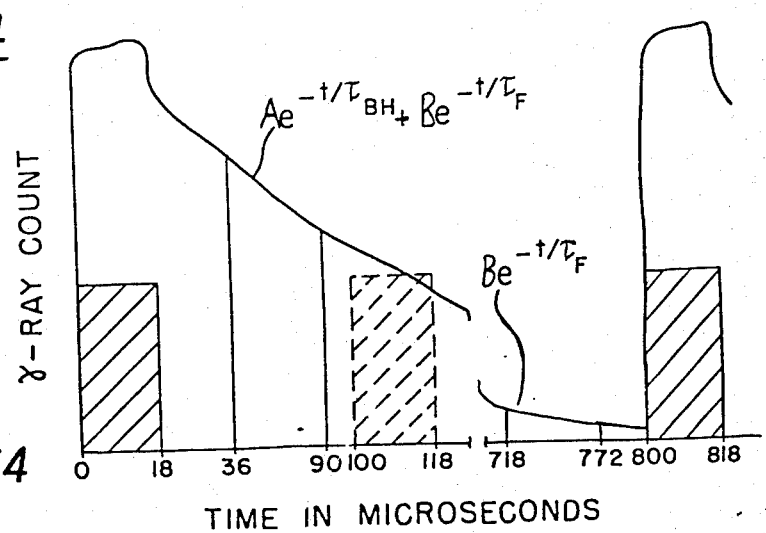

FIG. 2 is a diagramatic representation of the time distribution of gamma rays resulting from the irradiation of an earth formation with time-spaced bursts of fast neutrons. The hashed areas indicate the bursts of fast neutrons which last, in the illustrated embodiment, 18 microseconds. The inelastic spectrum is determined during this period, as is evident to those of skill in the art, and represents the spectrum of elements found in the borehole and in the formation.

Immediately after termination of the neutron burst, the gamma rays which result from the interaction of the neutrons with the contents of the borehole and the formation may be counted in the early capture spectrum time gate. This gate is illustrated under the count rate decay curve which has the notation $Ae^{-t/\tau_{BH}}+Be^{-t/\tau_F}$; the curve reflecting contributions from both the contents of the borehole and the formation. The early capture time gate in the illustrated embodiment commences at 36 microseconds after the start of the neutron burst, and terminates at 90 microseconds after the start of the neutron burst, during which time information on the compositions of the formation and the contents of the borehole is gathered. Should one desire to analyze a region immediately surrounding the borehole, i.e. to gain invasion information, in accord with this invention, the early capture time gate is chosen to commence later in time.

The well logging sonde 10 is conventionally used to bombard the earth formation 14 at 100 microsecond intervals. However, when the well logging sonde 10 is used in the preferred embodiment of this invention, additional neutron bursts are suppressed until 800 microseconds, thereby permitting the late capture spectrum to be measured. Accordingly, FIG. 2 depicts in phantom a suppressed neutron burst which would otherwise commence at 100 microseconds and terminate at 118 microseconds.

A late capture time gate is used to count the gamma rays emanating from the formation at a time when the gamma rays do not significantly reflect the composition of the contents of the borehole. In the illustrated embodiment, the late capture time gate begins at 718 microseconds and terminates at 772 microseconds after the beginning of the neutron burst. The late capture time gate is shown under the count ray decay curve $Be^{-t/\tau_F}$. This curve reflects the assumption that the gamma ray contribution is from the formation only. This result may be understood by recognizing that the neutron distribution soon after the burst tends to be localized near the source 24. As time goes on, the neutrons diffuse through the formation 14 such that the neutron density in the formation tends to increase while the neutron density in the borehole decreases. Moreover, neutron absorbers such as chlorine, iron, and boron found in the borehole as part of the sonde or as an ingredient of the borehole fluid, tend to quickly deplete the neutrons in the borehole capable of interacting and causing gamma rays to be emitted. Eventually, then, the neutron density in the borehole 12 may be assumed to be negligible (i.e. during the late capture time gate). Thus, while the early capture time gate gates gamma rays emanating from both the contents of the borehole and the formation, the late capture time gate gates gamma rays primarily emanating from the formation. By subtracting the signals resulting from the late capture spectrum comparison from the signals resulting from the early capture spectrum comparison, a close approximation of the constituents of the borehole contents is produced.

The approximation of the constituents of the borehole may be used in conjunction with the acquired inelastic spectrum signal and an inelastic spectrum standard to provide an improved analysis of the formation constituents. The acquired inelastic spectrum is compared to the inelastic spectrum standard to produce a signal representing the formation composition and borehole content. These signals are corrected by subtracting from the inelastic signal the borehole constituents determined by the early and late capture spectra comparisons and by adjusting the other elements by accounting for inaccuracies produced by the determined borehole salinity.

The approximation of the constituents of the borehole may further be used in conjunction with the acquired late capture signal and an altered late capture standard spectrum to provide a more accurate analysis of the formation constituents. While the borehole component of the acquired late capture spectrum is assumed to be negligible in the embodiments described above, those skilled in the art will appreciate that the borehole components do contribute somewhat to the detected late capture spectrum signal. Thus, the late capture signal is compared to a slightly altered late capture standard spectrum which accounts for borehole contents, and the produced signal is corrected by subtracting from the resulting signal the borehole constituents as determined from the early and late capture spectra comparisons.

As will be evident to those of skill in the art, the signal processing and cable interface circuits 44 can be used to record the early and late capture gamma ray counts on magnetic tape or other suitable recording devices for later processing remote from the site.

In operation, well logging sonde 10 is lowered into the borehole 12. As the length of cable 20 is shortened, the well logging sonde 10 is drawn up the wellbore 12. The length of the cable 20 is recorded on tape 70 for later processing in accord with the recorded signals. As the well logging sonde 10 travels up the wellbore 12, the pulsed neutron source 24 bombards the formation 14 with fast neutrons. The gamma ray detector 26 produces a gamma ray count representative of the gamma rays emanating from the contents of the borehole and the formation. These counts are transmitted along cable 20 for signal processing in the cable interface circuits where they may be stored on tape 70 for remote processing. Alternatively, the signals can be produced at the well site.

More than two neutron capture time gates may be used in appropriate circumstances. Such multiple time gates may be used, for example, when more complete compensation for the effects of the contents of the borehole is desired or when analysis of particular radial areas of the formation is desired, i.e. to determine invasion characteristics.

While particular embodiments of the present invention have been disclosed in the drawings and described in detail herein, various further modifications may be made without departing from the spirit and scope of the invention.

We claim:

1. A method of determining the composition of material adjacent a well-logging sonde positioned in a wellbore traversing a subterranean formation comprising the steps of:
    bombarding said material and said formation with high energy neutrons from said sonde;
    detecting gamma rays emanating from said material and said formation and generating a detection signal representative of said gamma rays;
    generating from said detection signal a combined formation-material determination signal representative of the composition of said material and said subterranean formation;
    generating from said detection signal a formation determination signal representative of the composition of said subterranean formation; and
    comparing said combined formation-material determination signal with said formation determination signal to generate a determination signal solely representative of the composition of said material adjacent said sonde.

2. A method according to claim 1 wherein said combined determination signal is selected to represent the composition of the contents of fluids in said wellbore and the composition of said subterranean formation.

3. A method according to claim 1 wherein said combined determination signal is selected to represent the composition of the region of the subterranean formation adjacent said wellbore and the composition of said subterranean formation.

4. A method according to claim 1 wherein:
    (a) said combined formation-material determination signal generating step comprises the steps of:
        (1) generating an early capture spectrum signal representative of the composition of the material adjacent said sonde and said subterranean formation; and
        (2) comparing said early capture spectrum signal with an early capture spectrum standard to produce said combined formation-material determination signal; and
    (b) said formation determination signal generating step comprises the steps of:
        (1) generating a late capture spectrum signal representative of the composition of said subterranean formation; and
        (2) comparing said late capture spectrum signal with a late capture spectrum standard to produce said formation determination signal.

5. A method of determining the spectral composition of the contents of a borehole traversing a subterranean formation comprising the steps of:
    bombarding said contents of said borehole and said formation with a source of high energy neutrons positioned in said borehole whereby gamma rays emanate from said contents and said formation in response thereto;
    generating an early capture spectrum signal representative of the gamma rays emanating from said formation and said contents of said borehole;
    generating a late capture spectrum signal representative of the gamma rays emanating from said formation;
    comparing said early capture spectrum signal with an early capture spectrum standard to generate a signal representative of the combined composition of said formation and said contents of said borehole;
    comparing said late capture spectrum signal with a late capture spectrum standard to generate a formation signal representative of the composition of said formation; and
    comparing said combined composition signal with said formation signal to generate a signal representative of the contents of said borehole.

6. A method according to claim 4 further comprising plotting said determination signal representative of the composition of said material adjacent said sonde graphically to indicate the spectral composition of said material.

7. A method of determining the composition of a subterranean formation having a borehole traversing therethrough comprising the steps of:
bombarding said borehole and said formation with high energy neutrons from a source positioned in the borehole;
generating an inelastic spectrum signal representative of the inelastic gamma rays emanating from said borehole and said formation as a result of neutron excitation;
generating an early capture spectrum signal representative of the capture gamma rays emanating from said borehole and from said formation;
generating a late capture spectrum signal representative of the capture gamma rays emanating primarily from said formation;
comparing said inelastic spectrum signal with an inelastic spectrum standard to generate a first signal representative of the detailed composition of said formation and borehole;
comparing said early capture spectrum signal with an early capture spectrum standard to generate a signal representative of the combined composition of said formation and said borehole;
comparing said late capture spectrum signal with a late capture spectrum standard to generate a formation signal representative of the composition of said formation;
comparing said combined composition signal with said formation signal to generate a signal representative of the composition of said borehole; and
comparing said first representative signal with said signal representative of the composition of said borehole to generate a corrected signal representative of the detailed composition of said formation.

8. A method according to claim 7 further comprising the step of plotting said corrected signal to indicate the detailed composition of said formation.

9. A method according to claim 7 wherein said bombarding step is repeated every 800 microseconds.

10. A method of determining the composition of a subterranean formation having a borehole traversing therethrough comprising the steps of:
bombarding said borehole and said formation with high energy neutrons from a source positioned in the borehole;
generating an early capture spectrum signal representative of the capture gamma rays emanating from said borehole and said formation;
generating an late capture spectrum signal representative of the capture gamma rays emanating primarily from said formation;
comparing said early capture spectrum signal with an early capture spectrum standard to generate a signal representative of the combined composition of said formation and said borehole;
comparing said late capture spectrum signal with a late capture spectrum standard to generate a formation signal primarily representative of the composition of said formation;
comparing said combined composition signal with said formation signal to generate a signal representative of the composition of said borehole; and
comparing said formation signal primarily representative of the composition of said formation with said signal representative of the composition of said borehole to generate an improved signal representative of the composition of said formation.

11. Apparatus for deriving the spectral composition of material adjacent a well-logging sonde positioned in a borehole traversing a subterranean formation, said sonde irradiating said material with fast neutrons thereby generating gamma rays, comprising:
means for generating an early capture signal representative of the gamma rays emanating from said material and said formation during a first time interval;
means for generating a late capture signal representative of the gamma rays emanating from said formation during a second time interval;
means for deriving a combined spectral analysis signal of said material and said formation from said early capture signal;
means for deriving a formation spectral analysis signal of said formation from said late capture signal; and
means for comparing said formation spectral analysis signal with said combined spectral analysis signal to derive a signal representative of the spectral composition of said material adjacent the well-logging sonde.

12. An apparatus according to claim 11 wherein said material adjacent a well-logging sonde comprises borehole fluid and wherein said signal representative of the spectral composition of said material adjacent the well-logging sonde is representative of the spectral composition of said borehole fluid.

13. An apparatus according to claim 11 and further comprising:
means for displaying said formation spectral analysis signal;
means for displaying said combined spectral analysis signal; and
means for displaying said material spectral analysis signal.

14. An apparatus according to claim 11 wherein:
said early capture signal is chosen to represent the composition of a first subterranean region immediately surrounding said borehole, and a formation region beyond said first region; and
said late capture signal is chosen to represent the composition of said formation region beyond said first region.

15. An apparatus according to claim 11 wherein said apparatus is also for deriving the spectral composition of said formation, further comprising:
means for generating an inelastic signal representative of the gamma rays emanating from said material and said formation during the inelastic time interval;
means for deriving a detailed combined spectral analysis signal of said material and said formation from said inelastic signal; and
means for comparing said detailed combined spectral analysis signal with said signal representative of the spectral composition of said material adjcent said sonde to correct said detailed combined signal and provide a detailed spectral analysis signal of said formation.

16. An apparatus according to claim 11 wherein said apparatus is also for deriving the spectral composition of said formation, further comprising:
means for comparing said formation spectral analysis signal with said signal representative of the spectral composition of said material adjacent said well-logging sonde to derive an improved formation spectral analysis signal.

* * * * *